United States Patent [19]
Huba et al.

[11] 3,819,535
[45] June 25, 1974

[54] CATALYST FOR OXIDATION OF HYDROCARBONS AND CARBON MONOXIDE

[75] Inventors: Francis Huba, Painesville; Irving Malkin, University Heights, both of Ohio

[73] Assignee: Diamond Shamrock Corporation, Cleveland, Ohio

[22] Filed: Apr. 13, 1972

[21] Appl. No.: 243,823

[52] U.S. Cl.............. 252/462, 252/463, 252/465, 423/213.2
[51] Int. Cl..................... B01j 11/06, B01j 11/22
[58] Field of Search.............. 252/462, 463, 465; 423/213, 213.2, 625, 626

[56] References Cited
UNITED STATES PATENTS

| | | | |
|---|---|---|---|
| 3,204,009 | 8/1965 | Keith | 260/683.2 |
| 3,226,340 | 12/1965 | Stephens et al. | 252/462 X |
| 3,284,370 | 11/1966 | Clifford et al. | 252/462 X |
| 3,291,564 | 12/1966 | Kearby | 252/463 X |
| 3,340,011 | 9/1967 | Hoekstra et al. | 252/463 X |
| 3,524,721 | 8/1970 | Stephens | 252/462 X |

FOREIGN PATENTS OR APPLICATIONS

| | | | |
|---|---|---|---|
| 1,136,021 | 12/1968 | Great Britain | 252/465 |

*Primary Examiner*—Daniel E. Wyman
*Assistant Examiner*—W. J. Shine
*Attorney, Agent, or Firm*—Helen P. Brush

[57] ABSTRACT

An improved catalyst for oxidation of hydrocarbons and carbon monoxide can be obtained by depositing a layer of copper oxide and then a layer of cerium oxide as catalysts on an alumina support which has been stabilized against shrinkage. When a preformed alumina support is used, the support can be stabilized against shrinkage by soaking the support in a solution of a barium salt and heat treating prior to depositing the copper oxide layer. An alumina support, which is stable against shrinkage, can be prepared by treating alumina powder with a solution of chromic acid and a barium or magnesium salt to form spheres which are then dried and heat treated.

7 Claims, No Drawings

CATALYST FOR OXIDATION OF HYDROCARBONS AND CARBON MONOXIDE

BACKGROUND OF THE INVENTION

1. Field of the Invention

This invention relates to an improved catalyst for treatment of exhaust gases from internal combustion engines to remove noxious components therefrom. More particularly, the invention relates to an improved copper oxide-cerium oxide catalyst on an alumina support which has been stabilized against shrinkage, to a process for stabilizing the support, to a process for preparing a stable support, to a process of depositing the catalytic metals onto the support to obtain the catalyst, and to a process using the catalyst for treatment of exhaust gases from internal combustion engines.

2. Description of the Prior Art

The noxious components in exhaust gases emitted by internal combustion engines are regarded as being one of the primary causes of air pollution and smog. Catalytic oxidation of the exhaust gases has been proposed as a method for elimination of these noxious components. In this method, exhaust gases, together with atmospheric oxygen, are passed through a catalyst bed wherein noxious components such as hydrocarbons and carbon monoxide are oxidized to carbon dioxide and water.

Development of a catalyst for the oxidation of hydrocarbons and carbon monoxide in exhaust gases presents numerous problems. A catalyst must be effective over a wide range of temperatures, i.e., temperatures as low as 200° C and as high as 900° C. Further, the catalyst must retain its activity for extended periods of time under adverse conditions encountered during use.

U.S. Pat. No. 3,226,340 issued Dec. 28, 1965, and British Pat. specification No. 942,841 published Nov. 27, 1963, describe preparation and use of catalysts for oxidation of carbon monoxide and hydrocarbons present in exhaust gases from internal combustion engines. A very active catalyst is obtained by depositing a layer of copper oxide on an alumina support but it loses its catalytic activity very rapidly during extended use under field conditions. Loss of activity is attributed to reaction of copper oxide with the alumina substrate to form copper aluminate which has much poorer physical properties than those of the original catalyst. It is reported in this patent that an improved catalyst can be obtained by mechanically separating the alumina substrate and the copper oxide to prevent this reaction. A layer of a metal oxide such as cerium oxide or chromium oxide is placed between the alumina substrate and the copper oxide layer. The metal oxide layer serves as a separator or barrier which prevents the reaction so that copper aluminate is not formed and the catalyst retains its high activity even after extended use under field conditions.

Further, U.S. Pat. No. 3,284,370, issued Nov. 8, 1966, describes use of a catalyst obtained by depositing a uniform mixture of copper oxide and cerium oxide on the surface of an alumina support.

SUMMARY OF THE INVENTION

An improved catalyst for oxidation of hydrocarbon and carbon monoxide in exhaust gases from an internal combustion engine is obtained by depositing a catalytically active layer of copper oxide and then a catalytically active layer of cerium oxide on an alumina support that has been previously stabilized against shrinkage. This catalyst is prepared by (1) impregnating the stabilized support with a solution of a thermally decomposable copper salt; thereafter (2) calcining the impregnated support to convert the salt in situ to a copper oxide layer on the support; then (3) impregnating the support with a solution of a thermally decomposable cerium salt; and thereafter (4) calcining the impregnated support to convert the salt in situ to a cerium oxide layer on the copper oxide layer on the support.

When a preformed alumina support is used, the support can be stabilized against shrinkage by soaking the support in a solution of a soluble barium salt and then heat treating the support at a high temperature, e.g., 800° to 1,150° C for 1 to 4 hours, before impregnation of the support with the copper salt solution. An alumina support, which is stable against shrinkage, can also be prepared by moistening alumina powder with a solution of chromic acid and a soluble barium or magnesium salt, forming spheres from the moistened powder, drying the spheres at about 100° C and then heat treating the dried spheres at 800° to 1,150° C for 1 to 10 hours before impregnation with the copper salt solution.

DESCRIPTION OF THE PREFERRED EMBODIMENTS

The improved catalyst has numerous desirable properties which make the catalyst suitable for use in automobile mufflers. It has a high activity for carbon monoxide combustion as well as sufficient activity to oxidize the hydrocarbons that are present in exhaust gases from an internal combustion engine. Further, the catalyst has a low ignition temperature for carbon monoxide and maintains high activity even after extended exposure to high temperatures. The catalyst is relatively light in weight and resists shrinkage even at high temperatures. Added advantage of the catalyst is that it also removes nitrogen oxide from oxygen lean exhaust mixtures.

Catalyst performance is dependent in part on use of an alumina catalyst support which has been previously stabilized against shrinkage. When a preformed alumina support is used, the support is stabilized by soaking the support in the solution of a metal salt and then heating the support at a high temperature before impregnating with the copper salt solution.

Effectiveness of the following metals in preventing shrinkage of the support has been determined. These metals are listed in decreasing order of effectiveness: B, Ba, Mo, rare earths, Sr, Ti, Ca, Zr, Co, Cr, Ce, control (no metal), Li, Mg, Cu, Fe, V, and Ni. Unfortunately, most of the effective metals have detrimental effects on activity of the catalyst and cannot be used. Barium and chromium are the most suitable metals. They provide satisfactory stability and do not have detrimental effects on catalyst activity. The support is stabilized by impregnating the support with a solution containing from 0.1 to about 0.3 M/l of a water soluble salt such as barium nitrate, barium chloride or barium acetate, and a solution containing 0.1 to about 5.0 M/l of chromic acid, drying the impregnated support at about 90° to about 110° C and then heating the dried support at about 800° to about 1,150° C for about 1 to about 4 hours. The water-soluble barium salt solution and the chromic acid solution are added to the support as a mixed solution or as separate solutions. The molar ratio employed of the alkaline earth metal to the chromium is from about 1.5 to about 0.75.

A stabilized alumina support can also be prepared by moistening low density hydrated alumina powder, pelletizing the moistened powder, drying the moistened pellets and then heat treating the dried pellets. Any commercial alumina powder having a low density and a high surface area can be used. The powder is moistened with a solution of chemicals which interacts with the powder to function as (1) a binder, (2) an anti-shrinking agent so that when the support and/or finished catalyst is subjected to heat, the low density and porosity of the catalyst is preserved, and (3) a catalytic activity promoter.

Moistened alumina powder can be pelletized by any one of several methods. It can be pelletized in a pellet press or by extrusion-spheroidization or spheroidized on a rotating disc. A binder should be used in these methods particularly in spheroidizing. Although many acids and chemical compounds interact with alumina, many have detrimental effects on catalyst activity and cannot be used as binders.

Nitric acid is a suitable binder for alumina because it can be easily decomposed and removed from the support by heating. However, in spheroidizing on a rotating disc, the preferred method for producing a low density support, nitric acid acts as an instant binder so that the powder does not form uniform spheres but odd sized irregularly shaped granules. If the nitric acid concentration is reduced, uniform spheres are obtained but they have poor physical strength.

It was felt that the binding problem might be solved by delaying release of nitric acid until after the spheres are formed. Investigation of this problem led to a study of reactions between alkaline earth metal nitrates and the water soluble Group VI-B transition metal oxides:

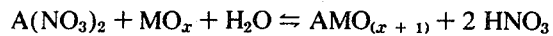

$$A(NO_3)_2 + MO_x + H_2O \rightleftharpoons AMO_{(x+1)} + 2\ HNO_3$$

wherein A is an alkaline earth metal and M is a Group VI-B transition metal. The product of the reaction having the lowest water solubility produces the highest yield of nitric acid. Although many of these nitrates and oxides react to form nitric acid, only a few are useful in this invention. Many of the salts and oxides are of metals that adversely affect catalytic activity and cannot be used. For example, reaction of barium nitrate or magnesium nitrate with chromium oxide enhances catalytic activity whereas substitution of molybdenum oxide for chromium oxide has a detrimental affect on catalytic activity.

One of the preferred binder reactions is:

$$Ba(NO_3)_2 + CrO_3 + H_2O \rightleftharpoons BaCrO_4 + 2\ HNO_3$$

Solubility of barium chromate is about 0.004 g/l. At use concentrations appreciable precipitation does not occur until after 15 minutes of reaction which is sufficient time to allow for formation of uniform spheres in the spheroidizing operation. However, in practice, solutions of barium nitrate and chromic acid may be sprayed separately and simultaneously or may be mixed only at the spray nozzle. This avoid premature precipitation which can occur if the solution is prepared in advance of its use.

In the spheroidizing operation, the feeding of the alumina powder and spraying of the binder solution onto the powder in the rotating pan are at experimentally determined rates which will give uniform spheres when the rotating pan is operated at the desired angle and speed. As the wet spheres are formed, they overflow the pan and are collected. If desired, the wet spheres can be subjected to additional tumbling to increase their hardness. The wet spheres are then dried at about 100° C and then heat treated at 800° to 1,150°C for 1 to 10 hours. This method produces stabilized spheres having a bulk density of from 25 to 35 lb/ft$^3$ and a hardness of from 2 to 3. The bulk density and hardness are determined by the following methods.

The bulk density is determined by vibrating the catalyst in a graduated cylinder until a constant volume is achieved. Weight and volume are then measured and the bulk density calculated.

Hardness can be measured qualitatively. If the catalyst particle can be crushed between the thumb and index finger, it is given a rating of one. If it cannot be crushed in this manner but can be crushed between the thumb and a rigid surface, such as a table top, it is rated a two. If it cannot be crushed in either of the above tests, it is rated three. Fractional ratings between zero and three are applied to further distinguish particle strength. Five to 10 particles are tested to arrive at an average rating. When greater precision is desired, individual particles can be crushed between flat plates on an Instron tensile testing machine. The pounds of force required to crush the particle is divided by the square of the particle diameter to provide a crush strength rating.

Stabilized spheres prepared by either of the above two methods are converted into catalysts for the oxidation of hydrocarbons and carbon monoxide. These catalysts are prepared by (1) impregnating the stabilized spheres with a solution of a thermally decomposable copper salt; thereafter (2) calcining the impregnated spheres to convert the salt in situ to a copper oxide coating as an outer layer on the spheres; then (3) impregnating the spheres with solution of a thermally decomposable cerium salt; and thereafter (4) calcining the impregnated spheres to convert the salt in situ to a cerium oxide coating as an outer layer on the copper oxide layer on the spheres. The molar ratio of copper:cerium may vary from about 4 to about 0.25. Since each oxide layer or coating is deposited as a separate layer or lamina on the surface of the spheres, the procedure is called layering or laminating.

Any water soluble or acid soluble copper compound may be used so long as the particular compound used decomposes to its oxide on heating. Suitable compounds include copper chlorides, copper nitrates, copper ammonium carbonate, organic copper salts such as cupric acetate, formate, citrate and the like.

Any water soluble or acid soluble cerium compound may be used in this invention so long as the particular compound used decomposes to its oxide on heating. Suitable compounds include cerous nitrate, cerium hydrate, cerium ammonium nitrate, bastnasite, cerium carbonate, cerium chloride, and the like.

Any suitable alumina hydrate or activated alumina powder can be formed into spheres by spraying the binder solution onto the alumina powder as it is tumbled on a rotating pan or in a rotating drum, or twin shell blender. The resulting alumina spheres are then dried and calcined. Any type of furnace such as a gas fired or electric furnace can be used for calcining the spheres. The spheres may be calcined in air or in a special atmosphere. It is also important that the alumina spheres are in activated form and are relatively pure. Silica and phosphorus should not be present in more than minor or trace amounts as they are detrimental to the activity of the catalyst.

Reference may also be made to the examples for a fuller understanding of this invention. The examples are given merely to illustrate the invention and are not to be construed in a limiting sense. All percentages, quantities, parts, and proportions are by weight and all temperatures are °C unless otherwise indicated.

EXAMPLE 1

This example demonstrates preparation of stabilized spheres useful as a catalyst support from alumina powder. The alumina powder is spray dried gel alumina having a surface area of about 350 m$^2$/g, a pore volume of 1.5 ml/g, a loss on ignition of about 28 percent, and a bulk density of 16 to 22 lb/ft$^3$.

In a slanted rotating pan, partially hydrated alumina powder is sprayed with an aqueous solution containing 0.33 M barium nitrate and 0.25 M chromic acid. This solution of barium and chromic acid is freshly prepared and applied before precipitation of barium chromate begins. Rates of feeding of additional powder and spraying of the solution are maintained so as to allow the balling and growth of the spheres. The angle and the number of revolutions per minute of the pan are adjusted so that those spheres which have attained the desired size are continuously discharged as overflow. After discharge from the pan, wet spheres are dried at 100° C and then stabilized by sintering at 1,000° C for 3 hr. The stabilized spheres have a BD (bulk density) of 25.6 lb/ft$^3$ and a hardness of 2.2–2.5. Data on sphere preparations from Example 1 through 15 are presented in Table 1. The purpose of these data is to illustrate that any divergence from the preferred procedure (Examples 1, 2, and 14) in spheroidizing alumina results in an inferior support.

EXAMPLE 2

Following the procedure in Example 1, spheres are formed by spraying a freshly prepared binder solution containing 0.3 M barium nitrate, 0.25 M chromic acid, and 10 ml nitric acid (70%) per liter onto alumina powder. The wet spheres are heated in a covered container for 2 hr in an oven at 95° C. Then the cover is removed and drying of the spheres is completed at 100°–105° C. The dried spheres are sintered at 1,000° C for 4 hr to obtain stabilized spheres having a BD of 31.7 lb/ft$^3$ and a hardness of 2.4– 2.6.

Examples 3 through 15 employ the general procedure of Example 2 with the indicated exceptions.

EXAMPLES 3–6

Alumina powder is spheroidized with the exception that 0.16 to 0.88 M nitric acid solutions instead of a barium nitrate-chromic acid solution are used as binder solutions. Uniform spheres are obtained with a 0.16 M nitric acid solution but the spheres are soft after sintering and have a hardness of 0.5 – 1.0, so they are not suitable for use as catalyst supports. Irregular shaped granules are obtained when higher concentrations of nitric acid are used. Bulk density of the spheres with adequate hardness before application of the catalyst is generally about 25 percent greater than spheres prepared by the preferred method. (Compare Example 6 and Example 14 where spheres have a BD of 33.2 and 26.7 lb/ft$^3$, respectively, and about the same hardnesses.)

In addition to these difficulties, spheres prepared using nitric acid as a binder solution are also more susceptible to shrinkage during the heat treatments used in catalyst preparations.

EXAMPLES 7–9

Three binder solutions containing 10, 30, and 50 ml/l of concentrated nitric acid (70%) respectively and saturated with barium nitrate are used to spheroidize alumina powder. Although roundness of the spheres is acceptable, they are still soft after sintering and powderize easily. The spheres have hardnesses of 0.3, 0.8, and 0.5, respectively.

EXAMPLE 10

A 0.16 M chromic acid solution containing 55 ml/l nitric acid (70%) is used as a binder solution. Spheroidization of the alumina powder is difficult. Finished particles are not spherical but granular and have hardnesses of 2 or less.

EXAMPLE 11

A 1.0 M chromic acid solution is used as a binder solution. Irregular spheres are obtained and many have porcupinelike protrusions. They have a BD of 28 lb/ft$^3$ and hardnesses of 1.8 to 2.3.

EXAMPLE 12

Alumina powder is sprayed while being tumbled with a binder solution containing 0.5 M magnesium nitrate and 0.5 M chromic acid. The spheres are dried and sintered at 1,000° C for 4 hr. They have a BD of 26 lb/ft$^3$ and hardnesses of 2.0 to 2.2.

EXAMPLE 13

A 0.33 M barium nitrate and 0.25 M molybdic acid binder solution is sprayed on alumina powder. Spheres are dried and then sintered at 1,150° C for 2 hr to obtain very soft spheres having a hardness of 0.5.

EXAMPLE 14

Alumina powder is sprayed with a binder solution containing 0.33 M barium nitrate and 0.17 M chromic acid. Spheres are dried and sintered to obtain good quality spheres having a BD of 26.7 lb/ft$^3$ and a hardness of 2.0 to 2.5. These spheres have much lower densities than the commercial spherical alumina after sintering at 1,150° C. (See Example 15.)

EXAMPLE 15

Commercial alumina spheres having a BD of about 28 lb/ft$^3$ and a hardness of 2.9 are sintered at 1,150° C for 1 hr. After sintering, the spheres have a BD of 42.3 lb/ft$^3$ AND A HARDNESS OF 2.9. These spheres are significantly heavier than those prepared using the methods in Examples 1, 2, and 14.

Table 1 summarizes the results obtained in Examples 1 through 15. These results show effect of changes in the composition of the binder solution. It should be noted that deviations from the preferred compositions in Examples 1, 2, and 14 either prevent formation of uniform spheres or produce spheres that are too soft having hardnesses of less than 2 or both. Example 15 demonstrates that sintering of a commercial spherical alumina support greatly increases its bulk density. Even though some commercial alumina supports have a BD as low as 28 lb/ft$^3$, they exhibit high reactivities toward the catalytic metals, significant shrinkages, and marked decreases in activity after heat treatment. Although these disadvantages can be minimized by prefiring the support, prefiring increases the density and decreases porosity, surface area, and activity. These disadvantages can be avoided by using the methods described in this invention.

A minimum hardness of 2 is considered necessary for a catalyst to have adequate resistance to attrition. Low bulk density is desirable for several reasons. For a given volume of a similar catalyst a lower bulk density means the catalyst will reach operating temperature more quickly as there is less mass to heat. Lower bulk density also indicates higher porosity. Therefore, diffusion into and out of the catalyst spheres will be more rapid. Finally, lower bulk density requires less raw materials per unit volume which lowers manufacturing costs.

the following properties:
BD: 38.4 lb/ft$^3$
Hardness: 2.2 –3.0
Surface Area: 58 m$^2$/g
Elemental Analysis Found: 2.28% Ba; 1.23% Cr; 5.9% Cu; and 9.7% Ce
Volumetric shrinkage of the catalyst after heating at 1,600° F for 24 hr: 0.47 percent Activity of the catalyst is determined in a test apparatus using a synthetic auto exhaust gas mixture to simulate the exhaust of an automobile. This gas mixture has the following composition:

| Composition (% Volume) | At Temperatures of | |
|---|---|---|
| | 250°C | 300° C |
| Carbon Monoxide (CO) | 1.5% | 1.0% |
| Propylene (Pr) | 0.2% | 0.2% |
| Water | 4.0% | 4.0% |
| Carbon Dioxide | 4.0% | 4.0% |
| Nitrogen | 78.5% | 80.8% |
| Air | 11.8% | 10.0% |

The gas mixture is passed through a catalyst bed

TABLE 1

MANUFACTURE OF SPHERICAL ALUMINA SUPPORT

| Example | Composition of Binder Solution (M/l) | | | | | Sintered | | Bulk Density | Hardness | Remarks |
|---|---|---|---|---|---|---|---|---|---|---|
| | Ba(NO$_3$)$_2$ | CrO$_3$ | HNO$_3$ | Mg(NO$_3$)$_2$ | MoO$_3$ | °C | hr | lb/ft$^3$ | | |
| 1 | 0.33 | 0.25 | | | | 1000 | 3 | 25.6 | 2.2–2.5 | Good spheres |
| 2 | 0.3 | 0.25 | 0.16 | | | 1000 | 4 | 31.7 | 2.4–2.6 | Good spheres |
| 3 | | | 0.16 | | | 940 | 4 | 17.4 | 1.0 | Too soft |
| 4 | | | 0.37 | | | 1150 | 2 | 27.8 | 2.0 | Deformed |
| 5 | | | 0.64 | | | 1150 | 2 | 29.8 | 2.2 | Deformed granules |
| 6 | | | 0.88 | | | 1150 | 2 | 33.2 | 2.2–2.5 | Deformed granules |
| 7 | 0.3 | | 0.16 | | | 1000 | 3 | 23.5 | 0.3 | Too soft |
| 8 | 0.25 | | 0.45 | | | 1150 | 2 | 26.0 | 0.8 | Too soft |
| 9 | 0.20 | | 0.80 | | | 1000 | 3 | 26.3 | 0.5 | Too soft |
| 10 | | 0.16 | 0.88 | | | | | | | Deformed granules |
| 11 | | 1.0 | | | | 1000 | 4 | 28.0 | 1.8–2.3 | Soft |
| 12 | | 0.5 | | 0.5 | | 1000 | 4 | 26.0 | 2.0–2.2 | Acceptable |
| 13 | 0.33 | | | | 0.25 | 1150 | 2 | | 0.5 | Too soft |
| 14 | 0.33 | 0.17 | | | | 1150 | 2 | 26.7 | 2.0–2.5 | Good spheres |
| 15 | Commercial spherical alumina (BD:29) | | | | | 1150 | 1 | 42.3 | 2.9 | High bulk density |

EXAMPLE 16

This example demonstrates preparation of a catalyst using a spherical alumina support. A spherical alumina support (4,160 g) prepared by spheroidizing alumina powder with the barium-chromium binder-stabilizer solution described in Example 2 is evacuated for 45 min at about 50 mm Hg pressure and then covered with 1 M copper nitrate solution; vacuum is released and the support soaked in the solution for 45 min. Excess copper nitrate solution is removed. The support is dried at 105° C and then sintered at 900° C for 4 hr in a stainless steel container, perforated on the bottom, through which preheated air is passed at a space velocity of about 2,400 volumes/hr from the beginning of the heating cycle to the end of the cooling cycle. Sintering converts copper nitrate to a copper oxide layer.

The above treatment is repeated using 1 M cerous nitrate solution instead of 1 M copper nitrate solution. After impregnation with cerous nitrate solution, the support is dried and sintered at 800° C for 4 hr in a stream of preheated air to convert cerous nitrate to a cerium oxide layer on the copper oxide layer on the support, which is the finished catalyst. The catalyst has heated to the indicated temperature at a space velocity of 30,000 catalyst bed volumes per hour. Gas mixture is analyzed by vapor phase chromatography before and after passing through the catalyst bed which is 5 inches long and is contained in a stainless tube having a ⅜ inch O.D. and a 0.034 inch wall. Combustion of carbon monoxide by the catalyst is 96 percent at 250° C and 100 percent at 300° C. This procedure is used to determine the percent of CO removed at 250° C in Examples 17 through 24. After heating 24 hr at 1,600° F, activity of the catalyst is 98 percent at 300° C. Removal of NO from the exhaust (lean in oxygen) by the catalyst is 100 percent at 300° C.

A second method for evaluating catalyst activity involves determining the temperatures at which 50 percent of the CO, hydrocarbon and NO components are removed by the catalyst from a synthetic auto exhaust gas at an hourly space velocity of 14,200. This method gives the following results:
50% CO removed at 246° F at 2.5% O$_2$
50% hydrocarbon at 627° F at 2.5% O$_2$
50% NO at 274° F at 0.1% O$_2$
50% NO at 721° F at 0.4% O$_2$ A third method of evaluating catalyst activity utilizes a Perkin-Elmer Model DSC–1B Differential Scanning Calorimeter to determine the temperature at which the catalyst will ignite carbon monoxide in air. A mixture of carbon monoxide and air (carrying 400 percent excess $O_2$ over the stoichiometric requirement for CO) is passed over the powdered catalyst while it is heated gradually. At the temperature at which oxidation of carbon monoxide begins, the instrument indicates an exothermic reaction. With this method, the ignition temperature for the above catalyst is 121° C.

EXAMPLE 17

A catalyst is prepared using an alumina support produced by the procedure of Example 1 which is then "layered" following the procedure of Example 16, with the exception that 1.5 M copper nitrate solution and 1 M cerous nitrate solution are used. The catalyst removes 79 percent of the CO at 250° C.

EXAMPLE 18

A catalyst is prepared using an alumina support produced by the procedure of Example 2 which is then "layered" following the procedure of Example 16, with the exception that 2 M copper nitrate solution and 0.5 M cerous nitrate solution are used. The catalyst removes 93 percent of CO at 250° C.

EXAMPLE 19

A catalyst is prepared using an alumina support produced by the procedure of Example 2 which is then "layered" following the procedure of Example 16, with the exception that 2 M copper nitrate solution and 1 M ceric ammonium nitrate solution are used. Also, sintering temperatures are reversed, that is, 800° C for 4 hr is used after impregnation with copper nitrate solution and 900° C for 4 hr after impregnation with the cerium salt solution. The catalyst removes 91 percent of the CO at 250° C.

EXAMPLE 20

A catalyst is prepared following the procedure of Example 16, with the exception that 1 M copper nitrate and 2 M cerous notrate solutions are used. The catalyst removes 93 percent of the CO at 250° C.

EXAMPLE 21

A catalyst is prepared using the magnesium-chromium stabilized support obtained in Example 12. The support is layered with 1 M copper nitrate solution and after sintering at 900° C for 4 hr is then layered with 1 M cerous nitrate solution using the procedure of Example 16. After a final sintering of 800° C for 4 hr, the catalyst is cooled. The catalyst removes 77 percent of the CO at 250° C.

EXAMPLE 22

A catalyst is prepared using the alumina support of Example 2 by subjecting the support to a "single" impregnation instead of layering. The support is evacuated for 30 min, covered with a solution containing 1 M copper nitrate and 1 M cerous nitrate. The vacuum is then released and the support soaked for 45 min. The resulting support is dried and then sintered at 900° C for 4 hr to obtain the catalyst. The catalyst removes 62 percent of the CO at 250° C.

EXAMPLE 23

A catalyst is prepared using the procedure of Example 22, with the exception that the final sintering is at 800° C for 4 hr instead of 900° C. The catalyst removes 54 percent of the CO at 250° C.

EXAMPLE 24

A single layer catalyst is prepared using the alumina support of Example 14 and impregnating the support in a solution contaiing 1.14 M copper nitrate, 0.57 M chromium nitrate and 0.14 M cerous nitrate. After drying and sintering at 750° C for 4 hr, the catalyst is cooled and evaluated. The catalyst removes 38 percent of the CO at 250° C.

Examples 16 through 20 demonstrate that the Cu:Ce molar ratio can range from 4.0 to 0.5 without markedly reducing the activity of the catalyst. Example 21 shows that magnesium nitrate can be substituted for barium nitrate without a loss in performance. Examples 22 through 24 indicate that applying the catalytically active metals together rather than in separate layers reduces the activity of the catalyst.

TABLE 2

| Catalyst Ex. No. | $Al_2O_3$ Support Ex. No. | With the Binder-Stabilizer of: | LAYERED WITH First Metal | Sintered °C | Second Metal | Sintered °C |
|---|---|---|---|---|---|---|
| 16 | 2 | Ba-Cr-H$^+$ | Cu$_1$ | 900 | Ce$_1$ | 800 |
| 17 | 1 | Ba-Cr | Cu$_{1.5}$ | 900 | Ce$_1$ | 800 |
| 18 | 2 | Ba-Cr-H$^+$ | Cu$_2$ | 900 | Ce$_{0.5}$ | 800 |
| 19 | 2 | Ba-Cr-H$^+$ | Cu$_2$ | 800 | Ce$_1$ (IV) | 900 |
| 20 | 2 | Ba-Cr-H$^+$ | Cu$_1$ | 900 | Ce$_2$ | 800 |
| 21 | 12 | Mg-Cr | Cu$_1$ | 900 | Ce$_1$ | 800 |
| 22 | 2 | Ba-Cr-H$^+$ | Cu$_1$-Ce$_1$ | 900 | None | None |
| 23 | 2 | Ba-Cr-H$^+$ | Cu$_1$-Ce$_1$ | 800 | None | None |
| 24 | 15 | Ba-Cr | Cu$_{1.1}$-Cr$_{0.5}$-Ce$_{0.14}$ | 750 | None | None |

Pr = Propylene
H$^+$ = HNO$_3$
Metal subscript indicates solution molarity.
Ce is trivalent unless otherwise shown as (IV).

TABLE 2.—Continued

| Catalyst Ex. No. | Activity % Combustion of: | | | | Total Comparative Value | NO % Removed at 300° C | Bulk Density of the Final Catalyst | Shrinkage % After 24 hr at 1600° C |
|---|---|---|---|---|---|---|---|---|
| | CO at | | Pr at | | | | | |
| | 250° C | 300° C | 250° C | 300° C | | | | |
| 16 | 95 | 100 | 9 | 37 | 241 | 100 | 38.4 | 0.47 |
| 17 | 79 | 92 | 10 | 23 | 204 | | 33.0 | |
| 18 | | 93 | | 24 | | 100 | | |
| 19 | 91 | 96 | 14 | 36 | 237 | | 34.7 | |
| 20 | 93 | 94 | 15 | 28 | 230 | | 40.7 | |
| 21 | 77 | 98 | 15 | 47 | 237 | 100 | | |
| 22 | 62 | 83 | 5 | 17 | 167 | 100 | 41.8 | 0.0 |
| 23 | 54 | | 4 | | | | | |
| 24 | 38 | 82 | 10 | 37 | 167 | | 32.1 | |

Pr = Propylene
H⁺ = HNO₃
Metal subscript indicates solution molarity.
Ce is trivalent unless otherwise shown as (IV).

EXAMPLE 25

A 150 g sample of 5 × 8 mesh size commercial alumina spheres having a BD of 32 lb/ft³ and a surface area of 263 m²/g is soaked in 1 M solution of barium chloride for 45 min. The spheres are then dried 16 hr at 100° C and calcined at 950° C for 4 hr. The resulting stabilized substrate is then divided into individual 10 g samples. These samples are then impregnated with the following solutions as indicated:

| Sample No. | Type of Solution |
|---|---|
| 1 | 1 M copper nitrate |
| 2 | 1 M copper nitrate and 1 M cerous nitrate mixed in equal volumes |
| 3 | 1 M copper nitrate |
| 4 | 1 M cerrium nitrate |
| 6 | 1 M cobalt nitrate and 1 M cerous nitrate mixed in equal volumes |
| 9 | 1 M silver nitrate and 1 M copper nitrate mixed in equal volumes |
| 10 | 1 M copper nitrate and 1 M iron nitrate mixed in equal volumes |

Samples are dried at 100° C for 16 hr and then calcined at 900° C for 4 hr.

Sample Nos. 3 and 4 are then impregnated with the following solutions as indicated:

| Sample No. | Type of Solution |
|---|---|
| 3 | 1 M cerous nitrate |
| 4 | 1 M copper nitrate |

Both samples are then dried and calcined at 900° C for 4 hr.

These samples are then evaluated for catalyst activity using the first test procedure described in Example 16 to obtain the following results:

| Sample No. | Composition of Catalyst | Percent Reduction at 250° C | |
|---|---|---|---|
| | | CO | Pr |
| 1 | Cu layer | 9 | 5 |
| 2 | Cu and Ce mixed layer | 57 | 0 |
| 3 | Cu layer + Ce layer | 81 | 9 |
| 4 | Ce layer + Cu layer | 55 | 8 |
| 6 | Co and Ce mixed layer | 2 | 2 |
| 9 | Ag and Cu mixed layer | 0 | 0 |
| 10 | Cu and Fe mixed layer | 3 | 0 |

The above results show that satisfactory catalytic activity is obtained only with mixtures of copper oxide and cerium oxide on a barium chloride stabilized substrate as in Samples 2, 3, and 4. Further, these results indicate that best catalytic activity is obtained when copper oxide and cerium oxide are applied as separate layers as in Samples 3 and 4 and cerium oxide is the outer layer as in Sample 3.

EXAMPLE 26

The procedure described in Example 25 is repeated with the exception that the spheres are stabilized by soaking in 0.5 M boric acid solution rather than barium chloride solution, dried at 100° C for 16 hr and then heated at 950° C for 4 hr.

Layered Sample Nos. 3 and 4 are heated to 400° C for 4 hr after application of the first layer to convert the nitrate to metal oxide. Final calcining temperature for all samples is 900° C for 4 hr. Evaluation of these samples gives the following results:

| Sample No. | Composition of Catalyst | Percent Reduction at 250° C | |
|---|---|---|---|
| | | CO | Pr |
| 1 | Cu layer | 2 | 4 |
| 2 | Cu and Ce mixed layer | 3 | 4 |
| 3 | Cu layer + Ce layer | 26 | 4 |
| 4 | Ce layer + Cu layer | 7 | 3 |

As in Example 25, the sample, which is treated first with copper nitrate and then with cerium nitrate, exhibits the highest catalytic activity. However, use of a boron compound instead of a barium compound as the stabilizer drastically reduces catalytic activites of all the samples.

EXAMPLE 27

A 20 g sample of the alumina spheres described in Example 25 is impregnated in a solution obtained by mixing 20 ml of 0.35 M of barium nitrate solution, 20 ml of 1.5 M cerous nitrate solution, and 20 ml of 1.5 M copper nitrate solution. The sample is dried at 95° C and then calcined at 900° C for 4 hr to obtain a catalyst. Activity of this catalyst is determined using the first test procedure described in Example 16. The catalyst removes 34 percent of the CO content and 4 percent of the Pr content at 250° C.

Examination of data in Examples 25–27 shows that simultaneous application of two or more solutions produces poor catalytic activity.

EXAMPLE 28

Samples of the alumina spheres described in Example 25 are stabilized with different barium compounds by soaking each sample in a solution of the indicated barium compound, drying the wet spheres, and calcining the dried spheres at 950° C for 4 hr. Each sample is then impregnated with a 1 M copper nitrate solution, dried, and calcined at 900° C for 4 hr, then impregnated with a 1 M cerous nitrate solution, dried, and calcined at 900° C for 4 hr. Catalytic activity of these samples determined using the first test procedure in Example 16 is as follows:

| Sample No. | Stabilizer Solution | Percent Reduction at 250° C | |
|---|---|---|---|
| | | CO | Pr |
| 2 | 0.33 M barium nitrate | 87 | 8 |
| 3 | 0.33 M barium chloride | 91 | 9 |
| 4 | 1 M barium acetate | 88 | 5 |
| 5 | 0.33 M barium acetate | 86 | 6 |

These results indicate that the source of barium cation is not important provided the anion decomposes, or volatilizes and is nonpoisonous. Also, concentration of barium cation appears to have very little effect on catalytic activity.

EXAMPLE 29

A 500 g sample of the alumina spheres described in Example 25 is soaked in a 1 M barium chloride solution. Spheres are dried at 95° C and then calcined at 950° C for 4 hr in a stream of air. The sample is subdivided into smaller samples which are then impregnated with 2.0, 1.0, or 0.5 M copper nitrate solutions, respectively, dried, and calcined at 900° C for 4 hr. Then the samples are impregnated with 1.0, 0.5, or 0.25 M ceric ammonium nitrate solutions, respectively, dried, calcined at 900° C for 4 hr and evaluated as catalysts. The percent reduction in CO and Pr content with each catalyst at 250° C is determined experimentally and these values are added to obtain the catalytic activity index numbers shown below:

| Concentration of Ceric Ammonium Nitrate Solution | Concentration of Copper Nitrate Solution | | |
|---|---|---|---|
| M | 2.0 | 1.0 | 0.5 |
| Activity | | Index | Numbers |
| 1.0 | 90 | 97 | 80 |
| 0.5 | 87 | 84 | 74 |
| 0.25 | 60 | 64 | 53 |

These results indicate that a 1 M copper nitrate solution gives satisfactory activity, that a 1 M cerium ammonium nitrate solution gives the best activity, and that a 0.5 M cerium ammonium nitrate solution gives good activity.

EXAMPLE 30

This example shows the effectiveness of boron, barium, and chromium compounds on the dimensional stability of copper oxide-cerium oxide catalysts which are deposited as layers on alumina spheres during catalyst preparation cycles as well as their effectiveness during high temperature shrinkage tests. Catalysts are prepared from essentially pure alumina spheres having a BD of 27.7 lb/ft$^3$ and a surface area of 269 in.$^2$/g. Approximately 98 percent of the spheres pass through a five mesh sieve but not through an eight mesh (U.S. Standard Sieve). Alumina spheres are evacuated at about 20 mm in a suction flask for 20 min. Then sufficient amount of one of the stabilizer solutions listed below is introduced into the flask to cover the spheres. After the spheres soak in the solution for 5 min, they are transferred to a Buchner funnel and excess solution removed. Then the wet spheres are dried at 100° C for 6–8 hr and calcined at 950° C for 4 hr to complete stabilization. Weight and volume changes are shown in Table 3.

Stabilizer Solutions
1. None, Control for comparison purposes.
2. Boric acid, CP, 1 M or 61.8 g/l.
3. Boric acid, CP, 0.5 M or 30.9 g/l.
4. Boric acid, CP, 0.1 M or 6.2 g/l.
5. a. Barium nitrate, CP, 0.33 M or 86.3 g/l 100 ml.

b. Chromic acid, tech grade, 50 g in water then add 1 ml conc, nitric acid and dilute with water to 100 ml. Mix 100 ml of (a) and 5 ml of (b) and use immediately.
6. Mix 100 ml of solution 5(a) and 5 ml of 5(b) with 105 ml of water.
7. Mix 100 ml of solution 5(a) and 5 ml of 5(b) with 210 ml of water.
8. Barium nitrate, CP, 0.1 M or 26.1 g/l.
11. Barium nitrate, CP, 0.33 M or 86.3 g/l.

Samples of stabilized alumina spheres are then layered with copper oxide and cerium oxide. These spheres are impregnated with 0.78 M or 146 g/l copper nitrate layering solution, prepared from a technical grade concentrated copper nitrate solution (14 percent copper). The impregnated spheres are dried at 100° C for 18 hr and then calcined at 900° C for 4 hr. Weight and volume changes are shown in Table 3. Then the spheres are impregnated with 0.5 to 1.0 M cerium layering solutions prepared from technical grade cerous nitrate pentahydrate (99.9 percent pure). After drying, the spheres are then calcined at 900° C for 4 hr to obtain the finished catalyst. Total volume changes are shown in Table 3.

The following physical characteristics of the catalysts are determined:
1. Volume change during the layering cycles.
2. Weight change during the layering cycles.
3. Volume change vs. control sample.
4. Bulk density.
5. Volume change after the shrinkage test of 24 hr at 1,600° F.
6. Activity as an oxidation catalyst.

Physical characteristics for Items (1) to (3) are shown in Table 3 and for Items (4) to (6) in Table 4.

TABLE 3

CHANGE OF VOLUME AND WEIGHT OF B, Ba or Cr STABILIZED Cu-Ce CATALYST

| Sample No. | Stabilizer Solution | | | Layered With Stabilizer | | | Layered With 0.78 M Copper | | |
|---|---|---|---|---|---|---|---|---|---|
| | | | | Weight (g) | Volume$^1$ (ml) | | Weight (g) | Volume (ml) | |
| | No. | Chemical | Conc. (M) | Gain | Loss | Vol. Loss as % of Control$^2$ | Gain | Loss | Vol. Loss as % of Control |
| 1 | 1 | None | | −7.6 | 38.0 | | 13.0 | 23.5 | |
| 2 | 2 | H$_3$BO$_3$ | 1.00 | 6.7 | 26.0 | 68 | 13.2 | 11.0 | 47 |

TABLE 3.—Continued

CHANGE OF VOLUME AND WEIGHT OF B, Ba or Cr STABILIZED Cu-Ce CATALYST

| | | | | Layered With Stabilizer | | | Layered With 0.78 M Copper | | |
|---|---|---|---|---|---|---|---|---|---|
| | | Stabilizer Solution | | Weight (g) | Volume[1] (ml) | Vol. Loss as % of Control[2] | Weight (g) | Volume (ml) | Vol. Loss as % of Control |
| Sample No. | No. | Chemical | Conc. (M) | Gain | Loss | | Gain | Loss | |
| 3 | 3 | $H_3BO_3$ | 0.50 | 3.3 | 29.0 | 76 | 13.2 | 28.0 | 120 |
| 4 | 4 | $H_3BO_3$ | 0.10 | 1.0 | 29.0 | 76 | 13.1 | 18.0 | 77 |
| 5 | 5 | $Ba(NO_3)_2$ | 0.32 | 19.3 | 28.0 | 74 | 13.5 | 7.0 | 29 |
| | | $CrO_3$ in $HNO_3$ | 0.24 | | | | | | |
| 6 | 6 | Ba | 0.16 | 10.0 | | | 13.2 | | |
| | | Cr | 0.12 | | | | | | |
| 7 | 7 | Ba | 0.08 | 4.8 | | | 13.5 | | |
| | | Cr | 0.06 | | | | | | |
| 8 | 8 | $Ba(NO_3)_2$ | 0.10 | 3.5 | | | 12.9 | | |
| 9 | 8 | $Ba(NO_3)_2$ | 0.10 | 3.5 | | | 12.9 | | |
| 10 | 8 | $Ba(NO_3)_2$ | 0.10 | 3.5 | | | 12.9 | | |
| 11 | 11 | $Ba(NO_3)_2$ | 0.33 | 8.3 | 28.0 | 74 | 13.0 | | |

[1] Volume was obtained by tapping and vibrating a graduated cylinder when the spheres were added.
[2] No. 1 as a control sample, figures obtained by dividing volume loss by volume loss of No. 1 × 100.

| | | Layered With Cerium | | | Total Volume Loss Due to Layering | | |
|---|---|---|---|---|---|---|---|
| | | Weight (g) | Volume (ml) | Vol. Loss as % of Control | | | As % of Control Sample |
| Sample No. | Ce Conc. (M) | Gain | Loss | | Ml | Percent | |
| 1 | 0.79 | 16.4 | 6.5 | | 68.0 | 22.7 | |
| 2 | 0.79 | 17.8 | 1.5 | 33 | 38.5 | 12.8 | 56.5 |
| 3 | 0.79 | 16.2 | 4.5 | 70 | 61.5 | 20.5 | 90.4 |
| 4 | 0.79 | 17.4 | 6.0 | 90 | 53.0 | 17.7 | 78.0 |
| 5 | 0.79 | 18.0 | 3.1 | 48 | 58.1 | 12.7 | 85.2 |
| 6 | 0.79 | 18.5 | | | 45.0 | 15.0 | 66.2 |
| 7 | 0.79 | 18.7 | | | 44.0 | 14.7 | 64.7 |
| 8 | 1.00 | 22.8 | | | 45.0 | 15.0 | 66.2 |
| 9 | 0.79 | 17.9 | | | 46.0 | 15.3 | 67.6 |
| 10 | 0.50 | 11.5 | | | 43.0 | 14.3 | 63.2 |
| 11 | 0.79 | 18.6 | | | 42.0 | 14.0 | 61.7 |

The following conclusions can be drawn from the data in Table 3:

1. An alumina catalyst support shrinks during prolonged heating at an elevated temperature. Shrinkage also occurs during the heat treatments when the spheres are layered with copper oxide and cerium oxide. The following volume losses are observed with the control sample, Sample No. 1.

| | |
|---|---|
| Volume loss after heating at 950° C for 4 hr | 12.7% |
| Volume loss after layering with Cu and heating at 900° C, 4 hr | 7.8 |
| Volume loss after layering with Ce and heating at 900° C, 4 hr | 2.2 |
| Total volume loss | 22.7% |

2. Boron is an effective volume stabilizer. Treatment of an alumina support in a 0.1 M boric acid solution (approximately 0.6 percent by weight $B_2O_3$ in the final catalyst) before layering reduces shrinkage of the finished catalyst by 22 percent when compared with the control sample. When higher concentrations of boric acid are used (1.0 M), shrinkage can be reduced by 44 percent.

3. Use of barium and chromium compounds as stabilizers before layering also reduces the total volume loss of a copper oxide-cerium oxide catalyst on alumina. Treatment of the alumina before layering with a solution containing 0.08 M Ba and 0.06 M Cr reduces volume loss of the finished catalyst by 35 percent. Use of higher concentrations of barium and chromium compounds further reduce the total volume loss.

4. When used alone, barium compounds are good stabilizers. Treatment with a 0.1 to 0.33 M barium compound solution before layering reduces volume loss by 34 to 38 percent.

TABLE 4

DENSITY, SHRINKAGE TEST AND ACTIVITY OF STABILIZED Cu-Ce CATALYST

| Sample No. | Stabilizer M | Cu M | Ce M | Bulk Density lb/ft³ | Shrinkage Test % Loss[1] | Catalytic Activity | | | | Total |
|---|---|---|---|---|---|---|---|---|---|---|
| | | | | | | 250° C | | 300° C | | |
| | | | | | | CO | Pr³ | CO | Pr³ | |
| 1 | None | 0.78 | 0.79 | 41.9[2] | 1.6 | 85 | 7 | 90 | 14 | 196 |

TABLE 4.—Continued

DENSITY, SHRINKAGE TEST AND ACTIVITY OF STABILIZED Cu-Ce CATALYST

| Sample No. | Stabilizer M | Cu M | Ce M | Bulk Density lb/ft$^3$ | Shrinkage Test % Loss[1] | Catalytic Activity 250° C | | 300° C | | Total |
|---|---|---|---|---|---|---|---|---|---|---|
| 2 | B 1.0 | 0.78 | 0.79 | 39.2 | 0.4 | 29 | 2 | 60 | 0 | 99 |
| 3 | B 0.5 | 0.78 | 0.79 | 41.7 | 0.7 | 14 | 0 | | | |
| 4 | B 0.1 | 0.78 | 0.79 | 41.9 | 1.0 | 45 | 2 | 77 | 6 | 130 |
| 5 | Ba 0.32 Cr 0.24 | 0.78 | 0.79 | 42.5 | 0.6 | 33 | 0 | | | |
| 6 | Ba 0.16 Cr 0.12 | 0.78 | 0.79 | 41.4 | 0.7 | 64 | 4 | 85 | 14 | 167 |
| 7 | Ba 0.08 Cr 0.06 | 0.78 | 0.79 | 40.0 | 2.7 | 73 | 9 | 94 | 37 | 193 |
| 8 | Ba 0.1 | 0.78 | 1.0 | 41.2 | 3.6 | 87 | 7 | 92 | 26 | 212 |
| 9 | Ba 0.1 | 0.78 | 0.79 | 39.8 | 3.1 | 85 | 7 | 90 | 23 | 205 |
| 10 | Ba 0.1 | 0.78 | 0.5 | 37.5 | 3.0 | 84 | 7 | 89 | 23 | 205 |
| 11 | Ba 0.33 | 0.78 | 0.79 | 40.4 | 2.3 | 84 | 7 | 93 | 23 | 209 |

[1] Percent volume loss due to heating at 1600° F for 24 hours; based on the volume of the final catalysts, size No. 8 to No. 5 mesh.

[2] Original density of the unfired spheres - 30 lb/ft$^3$.

[3] Pr = Propylene

The following conclusions can be drawn from the data in Table 4:

1. Bulk density of alumina spheres increases from 30 to 41.9 lb/ft$^3$ during layering because of shrinkage in sphere volume and metal pick-up. When boron, barium, or chromium compounds are used as stabilizers, bulk density increases are less than with the control sample. The only exception was Sample No. 5 where a heavy metal pick-up occurs with the chromium compound. A catalyst having a bulk density of 37.5 lb/ft$^3$ can be prepared by using separate solutions containng 0.1 M Ba, 0.78 M Cu, and 0.5 M Ce, respectively.

2. Boron compounds can be used to inhibit volume shrinkage up to 24 hr at a high temperature (1,600° F). Concentration of the boron compound determines the extent of volume shrinkage. Barium and chromium compounds give similar results.

3. A 0.1 M barium compound solution does not have any stabilizing effect during the shrinkage test, but does reduce the amount of shrinkage during catalyst prepartion.

4. Barium compounds appear to enhance catalyst activity slightly whereas chromium compounds reduce catalyst activity slightly. Large amounts of boron compounds are detrimental to catalyst activity. Cerium compound concentrations of 0.5 M to 1.0 M have minor effects on catalyst activity.

Two commercial alumina supports, which do not shrink significantly when exposed to high temperature have the following physical characteristics:

| Substrate | A | B |
|---|---|---|
| Size (mm) | 2.4–4 | 2–4 |
| Na$_2$O (%) | 0.7 | 0.06 |
| SiO$_2$ (%) | 0 | 0.02 |
| Pore Volume (cc/g) | 0.45–0.50 | 0.57 |
| Surface Area (M$^2$/g) | 350 | 100 |

These supports are used without stabilization as supports in the following catalyst preparations.

| Substrate | A | B |
|---|---|---|
| Weight used, g | 1238 | 1325 |
| Weight without water, g | 1220 | 1275 |
| Volume, vibrated, ml | 1560 | 1610 |
| Bulk Density, lb/ft$^3$ | 49.0 | 50.8 |
| Copper Layering | | |
| Temperature of furnace, °C | 950 | 950 |
| Time for Calcining, hr | 4 | 4 |
| Solution Conc. M Cu(NO$_3$)$_2$ | 0.78 | 0.78 |
| Copper deposited as CuO, g | 61 | 70 |
| Cerium Layering | | |
| Temperature, °C | 900 | 900 |
| Time, hr | 4 | 4 |
| Solution conc. M Ce(NO$_3$)$_3$ | 0.79 | 0.79 |
| Ce deposited as CeO$_2$, g | 96 | 83.7 |
| Catalyst | | |
| Weight, g | 1377 | 1429 |
| Volume, vibrated, ml | 1490 | 1520 |
| Bulk density, lb/ft$^3$ | 58.0 | 58.8 |
| CuO % by weight | 4.4 | 4.9 |
| CeO$_2$ % by weight | 7.0 | 5.8 |
| Increase of bulk density, % | 18 | 14 |
| Shrinkage of volume due to layering, % | 4.5 | 5.6 |
| Shrinkage test at 1600° F 24 hr, % of volume loss | 0.5 | 0.5 |
| Activity at 300° C | CO  Pr | CO  Pr |
| | 90  11 | 80  0 |

It is evident from the above results that the finished catalysts have higher bulk densities and lower activities than catalysts prepared from the stabilized substrates of this invention.

It is to be understood that although the invention has been described with specific reference to particular embodiments thereof, it is not to be so limited, since changes and alterations therein may be made which are within the full intended scope of this invention as defined by the appended claims.

What is claimed is:

1. A process of producing a stabilized alumina catalyst support comprising
   a. spheroidizing feeds of alumina powder and a binder solution comprising from about 0.1 to about 0.3 moles per liter of an alkaline earth metal nitrate selected from the group consisting of barium nitrate and magnesium nitrate and from about 0.1 to about 5 moles per liter of chromic acid to obtain wet spheres wherein the nitrate and the acid are applied in solution form as a mixed solution or as separate solutions; and the molar ratio of alkaline earth metal to chromium is from about 1.5 to about 0.75;
   b. drying the wet spheres at about 90° to about 110° C; and thereafter
   c. heat treating the dried spheres at about 800° to about 1,150° C.

2. The stabilized alumina support produced by the process of claim 1.

3. In a process for producing a copper oxide-cerium oxide catalyst for oxidation of hydrocarbons and carbon monoxide, the improvement in the process comprising
   a. producing a stabilized alumina support by a method comprising the steps of
      1. spheroidizing feeds of alumina powder and a binder solution comprising from about 0.1 to about 0.3 moles per liter of an alkaline earth metal nitrate selected from the group consisting of barium nitrate and magnesium nitrate and from about 0.1 to about 5.0 moles per liter of chromic acid to obtain wet spheres wherein the nitrate and the acid are applied in solution form as a mixed solution or as separate solutions; and where the molar ratio of alkaline earth metal to chromium is from about 1.5 to about 0.75, then
      2. drying the wet spheres at about 90° to about 110°C, then
      3. heat treating the dried spheres at about 800° to about 1,150°C, and thereafter
      4. cooling the heat treated spheres to obtain the stabilized alumina support; then
   b. applying a 0.5 to 2.0 M copper salt solution to the stabilized alumina support and then calcining the copper salt to form a copper oxide layer on the carrier; and thereafter
   c. applying a 0.5 to 2.0 M cerium salt solution to the copper oxide layer on the support and then calcining the cerium salt to form a cerium oxide layer on the carrier.

4. The process of claim 3 wherein the copper salt is selected from the group consisting of copper nitrate, copper chloride, copper carbonate, copper salts of organic acids, and ammonium complexes of said copper salts.

5. The process of claim 3 wherein the cerium salt is selected from the group consisting of cerium nitrate, cerium carbonate, cerium hydrate, cerium chloride, and ammonium complexes of said cerium salts.

6. The process of claim 3 wherein the molar ratio of copper:cerium is from about 4 to about 0.25.

7. The catalyst produced by the process of claim 3.

* * * * *

UNITED STATES PATENT OFFICE
CERTIFICATE OF CORRECTION

Patent No. 3,819,535                    Dated June 25, 1974

Inventor(s) Francis Huba and Irving Malkin

It is certified that error appears in the above-identified patent and that said Letters Patent are hereby corrected as shown below:

In Col. 13, line 38, the term "Activity" should be removed from the beginning of the line and placed under "2.0", so that the columns of figures are identified as "Activity Index Numbers".

In Col. 15, line 57, the numerical value "2.2" should be removed from the beginning of the line and placed within the column of figures so that the volume loss of the alumina support after layering with Ce and heating at 900° C for 4 hours is identified as --2.2%--.

Signed and sealed this 1st day of October 1974.

(SEAL)
Attest:

McCOY M. GIBSON JR.                     C. MARSHALL DANN
Attesting Officer                       Commissioner of Patents